United States Patent [19]

Scholl et al.

[11] Patent Number: 4,500,165
[45] Date of Patent: Feb. 19, 1985

[54] METHOD AND APPARATUS FOR ALIGNING OPTICAL FIBERS

[75] Inventors: Frederick W. Scholl, Riverdale; Michael H. Coden, New York, both of N.Y.

[73] Assignee: Codenoll Technology Corporation, Yonkers, N.Y.

[21] Appl. No.: 364,649

[22] Filed: Apr. 2, 1982

[51] Int. Cl.³ .............................................. G02B 5/14
[52] U.S. Cl. .................................................. 350/96.20
[58] Field of Search ...................................... 350/96.20

[56] References Cited

U.S. PATENT DOCUMENTS 4,237,474 12/1980 Ladany ............................ 350/96.20

Primary Examiner—William L. Sikes
Assistant Examiner—Robert E. Wise
Attorney, Agent, or Firm—Pennie & Edmonds

[57] ABSTRACT

The alignment of optical fibers is improved by mounting the optical fiber on a mounting block that has a sloping surface relative to an underlying support that bears both the fiber and a light source or photodetector. As a result, the alignment of the fiber and the light source or photodetector may be maintained in the vertical direction by the correct position of the fiber on the sloping surface of the mounting block. The alignment of the fiber in the horizontal direction is determined by the position of the mounting block on the support. Such an arrangement permits the weight of the fiber to be supported by the block while an appropriate cement is being cured to hold the fiber and block in place. Advantageously the mounting block is transparent to ultraviolet (UV) light and UV curable cements are used to secure the fiber to the mounting block and the block to the support. As a result, when the fiber is aligned both vertically and horizontally, it can be cemented into position quickly by applying cement to secure the fiber to the block and the block to its support and curing all the cement simultaneously by passing UV light through the transparent block.

6 Claims, 3 Drawing Figures

METHOD AND APPARATUS FOR ALIGNING OPTICAL FIBERS

TECHNICAL FIELD

The present invention relates to the alignment of an optical fiber with a light source such as an electroluminescent semiconductor diode or a photodetector, and more particularly to the alignment of an end of the optical fiber with the light emitting surface of the diode or the photosensitive surface of a photodetector.

BACKGROUND OF THE INVENTION

Optical communication systems are presently being developed which include a light source, a light detector and an optical fiber connected between the light source and the detector. In such systems, electroluminescent semiconductor diodes, such as laser diodes and light emitting diodes, are used as the light source. To connect the optical fiber to the electroluminescent diode so that the light from the diode enters the optical fiber, it is necessary to align the optical fiber with the surface of the electroluminescent diode from which the light is emitted. Similarly, it is necessary to align the optical fiber with the photosensitive surface of the light detector.

In the prior art, for example, the diode and the optical fiber typically are each mounted on separate mounting blocks. After the end of the optical fiber is aligned with the light emitting surface of the diode by moving the two mounting blocks relative to each other, the mounting blocks are secured together with a suitable cement, generally a resin cement which is then cured, to hold the optical fiber in alignment with the diode.

In one technique described in U.S. Pat. No. 4,237,474, incorporated herein by reference, an electroluminescent semiconductor diode assembly includes an electroluminescent semiconductor diode mounted on a mounting block, and an optical fiber mounted on a securing block with an end of the optical fiber being adjacent to and aligned with a light emitting end surface of the diode. The securing block can be moved both vertically and horizontally to permit alignment with the diode. The two mounting blocks are secured together through at least one thin layer of cement. The cement layer is thin enough to minimize relative movement between the mounting blocks when the cement is cured but thick enough to permit ease of movement between the mounting blocks prior to curing the cement. Unfortunately while the cement is curing it is necessary to maintain the fiber in the correct position a problem that is complicated by the need to permit vertical movement of the securing block for purposes of alignment.

SUMMARY OF THE INVENTION

We have found that the alignment of an optical fiber with a light source or photodetector may be improved by mounting the optical fiber on a mounting block that has a sloping surface relative to an underlying support that bears both the fiber and the light source (or detector). As a result, the alignment of the fiber and the light source (or detector) may be maintained in the vertical direction by the correct position of the fiber on the sloped surface of the mounting block. The alignment of the fiber in the horizontal directions is determined by the position of the mounting block on the support. Likewise, the distance between the fiber and the light source (or detector) may be controlled by the portion of the block on the support or the fiber on the block. Such an arrangement permits the weight of the fiber to be supported by the block while an appropriate cement is being cured to hold the fiber and block in place.

Advantageously the mounting block is transparent to ultraviolet (UV) light and UV curable cements are used to secure the fiber to the mounting block and the block to the support. As a result, when the fiber is aligned both vertically and horizontally, it can be cemented into position quickly by applying cement to secure the fiber to the block and the block to its support and curing all the cement simultaneously by passing UV light through the transparent block.

Use of this technique permits alignment of any type of optical fiber or fiber bundle (including single mode fibers) from the largest diameters to the smallest to accuracies limited only by the accuracy of the positioner used to align the fiber with the light source or detector.

BRIEF DESCRIPTION OF THE DRAWING

These and other objects, features, elements and advantages of our invention will be more readily apparent from the following description of the best mode for carrying out the invention wherein.

BEST MODE FOR CARRYING OUT THE INVENTION

Figure 1:
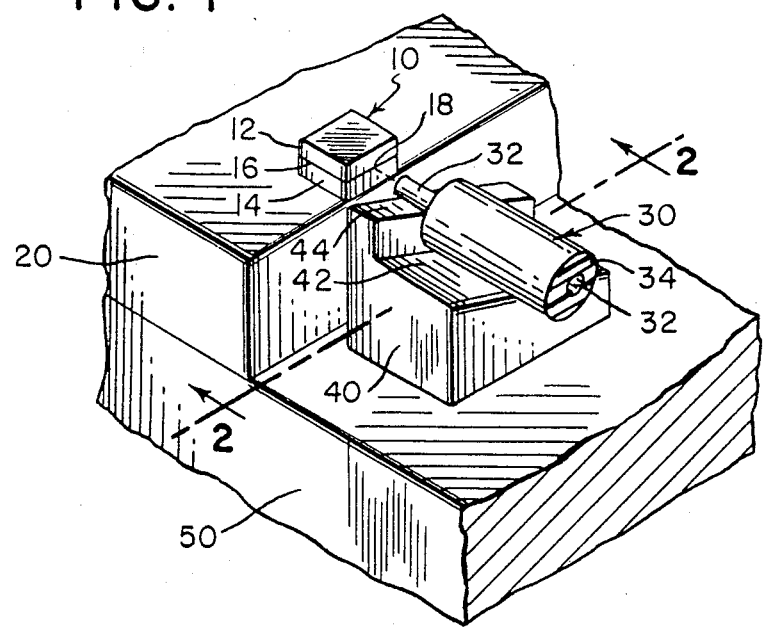
FIG. 1 is a perspective view of a portion of an illustrative embodiment of our invention, showing its use in aligning an optical fiber with a light source.
Figure 2:
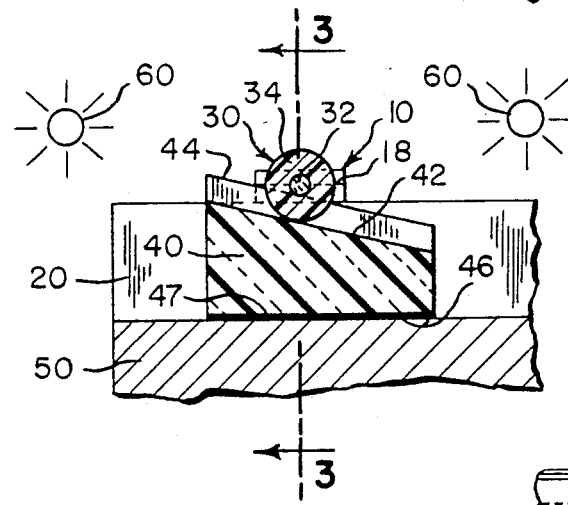
FIG. 2 is a sectional view taken along line 2—2 of FIG. 1.
Figure 3:
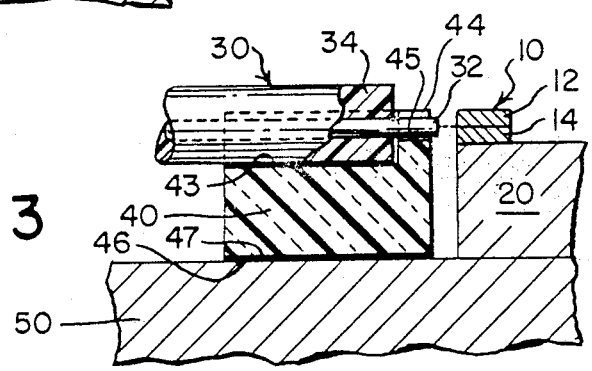
FIG. 3 is a sectional view taken along line 3—3 of FIG. 2.

In the illustrative embodiment of FIG. 1, there is shown a light source 10, a heat sink 20, an optical fiber 30, a UV-transparent mounting block 40 and a circuit board 50. Light source 10 illustratively is a semiconductor diode made of a semiconductor material such as a Group III-V compound or alloys of such compounds having regions 12 and 14 of opposite conductivity types forming a PN junction 16 therebetween. The PN junction 16 extends to at least one surface 18 from which light is emitted from the device. The electroluminescent semiconductor diode 10 may be either a laser diode or a light emitting diode of any well known construction, such as that described in U.S. Pat. No. 3,974,514 to H. Kressel, et al., issued Aug. 10, 1976.

Light source 10 is mounted on heat sink 20 which, in turn, is mounted on circuit board 50. Any known method may be used to connect regions 12, 14 of the diode to an appropriate electrical circuit for controlling the emission of light from said diode.

Optical fiber 30 comprises a light transmissive guide 32 and a jacket 34. The fiber is mounted on mounting block 40 with the outer surface of the jacket resting on a first sloping surface 42 of the block and the light guide resting on a second sloping surface 44 of the block. As is apparent from the drawing, surfaces 42 and 44 are parallel to one another and tangential to the outer surfaces of the jacket and the guide, respectively. Thus the distance between surfaces 42 and 44 is equal to the thickness of jacket 34. Mounting block 40, in turn, is mounted on circuit board 50. As will also be apparent, surfaces 42 and 44 are at an angle to the bottom surface 46 of block 40 so that projections of surfaces 42 and 44 intersect the plane of board 50 at an angle. As a result, the height of any point on surface 42 or 44 from board 50 depends on the position of that point on the surface.

To align optical fiber 30 with light source 10, the light source is first mounted on the heat sink and the heat sink is secured to circuit board 50. Optical fiber 30 is then aligned with light source 10 by means of any conventional micropositioner (not shown) capable of achieving the desired alignment accuracy. Typically proper alignment is determined by testing the output of the optical fiber to determine that point at which there is maximum light coupling from the light source to the fiber.

While the optical fiber is held in the micropositioner in the desired alignment, mounting block 40 is moved under the fiber into a position to support the fiber whereupon the outer surface of jacket 34 rests on sloping surface 42 and the outer surface of guide 32 rests on sloping surface 44. Layers 43 and 45 of a UV-curable cement are then applied to secure the jacket and the guide of fiber 30 to the first and second sloping surfaces, respectively, of mounting block 40; and a UV-curable cement layer 47 is applied between bottom surface 46 and board 50 to secure the block to circuit board 50. If necessary, the fiber is repositioned to maximize light coupling between source 10 and the fiber. Finally, cement layers 43, 45 and 47 are cured simultaneously by irradiating them with ultraviolet light from one or more UV sources 60.

Numerous UV-curable cements will be known to those skilled in the art. Advantageously, to permit simultaneous curing of layers 43, 45 and 47, block 40 should be transparent to UV light. This can readily be achieved by using a UV-transparent Plexiglas material, a thermosetting epoxy or glass for block 40. The first materials have the advantage of cost while glass can be used for high temperature applications where the others may not be suitable.

As will be apparent to those skilled in the art numerous modifications may be made in our invention without departing from the spirit and scope thereof. For example, in some applications it may not be necessary to mount guide 32 of the optical fiber on a surface of the mounting block distinct from that on which jacket 34 is mounted. Thus, the mounting block could have a single sloping surface to which the jacket of the optical fiber is cemented. Alternatively, where the guide is cemented to a sloping surface of the mounting block, it may not be necessary to cement the jacket into place on such block. As will also be apparent numerous types of cement may be used to secure the optical fiber to the mounting block and the block to the substrate. Cements are available that are curable by infra-red radiation and visible light as well as UV. With such cements, mounting blocks may be used that are transparent to light of such frequencies or it may be desirable simply to cement the block to the substrate around its edges.

What is claimed is:

1. Apparatus for aligning an optical fiber with a light source or photodetector comprising:
   a substrate;
   means for mounting said light source or photodetector on said substrate; and
   means for mounting said optical fiber on said substrate such that said optical fiber is aligned with said light source or photodetector to permit coupling of light therewith, said mounting means having a sloping surface set at an angle to the plane of said substrate, said optical fiber being cemented onto the sloping surface which aligns it with said light source or photodetector, and said sloping surface being tangent to an outer surface of said optical fiber.

2. The apparatus of claim 1 wherein said mounting means for said optical fiber is cemented to said substrate.

3. The apparatus of claim 2 wherein said mounting means for said optical fiber is transparent to light of at least one range of frequencies and the cements which secure said optical fiber to said mounting means and said mounting means to said substrate are cured by light having frequencies within said range of frequencies.

4. The apparatus of claim 3 wherein said range of frequencies is the ultraviolet frequencies.

5. A method of aligning an optical fiber with a light source or photodetector comprising the steps of:
   mounting said light source or photodetector on a substrate;
   aligning an optical fiber with said light source or photodetector so as to achieve a desired optical coupling between said light source or photodetector and said fiber,
   placing under said fiber a support having a first surface in contact with said substrate and a second surface at an angle to said first surface, said second surface being tangent to an outer surface of said optical fiber, and
   cementing said optical fiber to the second surface of said support and cementing said first surface of said support to said substrate.

6. The method of claim 5 wherein said cements are cured by light radiation further comprising the steps of irradiating said elements with such radiation.

* * * * *